(12) United States Patent
Gäng et al.

(10) Patent No.: US 6,428,581 B1
(45) Date of Patent: *Aug. 6, 2002

(54) CONCENTRATED LEUCOINDIGO SOLUTIONS

(75) Inventors: Manfred Gäng, Bobenheim-Roxheim; Rudolf Krüger, Weisenheim; Peter Miederer, Hassloch, all of (DE)

(73) Assignee: DyStar Textilfarben GmbH & Co. Deutschland KG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/720,818

(22) PCT Filed: Jul. 2, 1999

(86) PCT No.: PCT/EP99/04591

§ 371 (c)(1),
(2), (4) Date: Jan. 12, 2001

(87) PCT Pub. No.: WO00/04100

PCT Pub. Date: Jan. 27, 2000

(30) Foreign Application Priority Data

Jul. 13, 1998 (DE) .......................................... 198 31 291

(51) Int. Cl.$^7$ ............................. C09B 67/30; D06P 1/22
(52) U.S. Cl. ................................ 8/527; 8/653; 548/458
(58) Field of Search ....................... 8/527, 653; 548/458

(56) References Cited

U.S. PATENT DOCUMENTS

| 963,377 | A | * | 7/1910 | Liebknecht |
| 1,247,927 | A | * | 11/1917 | Brochet |
| 2,130,878 | A | * | 9/1938 | Davidson et al. |
| 5,586,992 | A | * | 12/1996 | Schnitzer et al. |
| 5,637,116 | A | * | 6/1997 | Gaeng et al. |
| 5,888,254 | A | * | 3/1999 | Gang et al. |

FOREIGN PATENT DOCUMENTS

| DE | 2729073 | * | 11/1979 |
| DE | 19502968 | * | 8/1996 |
| FR | 473536 | * | 1/1915 |
| FR | 769353 | * | 8/1934 |
| FR | 67043 | * | 11/1957 |
| WO | WO 94/23114 | * | 10/1994 |

* cited by examiner

Primary Examiner—Margaret Einsmann
(74) Attorney, Agent, or Firm—Oblon, Spivak, McClelland, Maier & Neustadt, P.C.

(57) ABSTRACT

Concentrated leuco indigo solutions useful for dyeing cellulosic textile material consist essentially of from 25 to 55% by weight of leuco indigo in the form of the leuco indigo salt, an amount which is essentially stoichiometrically sufficient to convert the leuco indigo into the neutral leuco indigo salt of a mixture of at least two alkali metal hydroxides wherein none of the alkali metal hydroxides accounts for more than 70 mol %, and water.

8 Claims, No Drawings

CONCENTRATED LEUCOINDIGO SOLUTIONS

DESCRIPTION

The present invention relates to novel concentrated leuco indigo solutions consisting essentially of from 25 to 55% by weight of leuco indigo in the form of the leuco indigo salt, an amount which is essentially stoichiometrically sufficient to convert the leuco indigo into the neutral leuco indigo salt of a mixture of at least two alkali metal hydroxides wherein none of the alkali metal hydroxides accounts for more than 70 mol %, and water.

This invention further relates to the preparation of these leuco indigo solutions and to their use for dyeing cellulosic textile material.

Indigo is a well-known vat dye which is used for dyeing cellulosic textile material, especially cotton warp yarns for blue denim articles.

To dye the water-insoluble indigo, it first has to be reduced (vatted) to convert it into the water-soluble leuco form which has affinity for fiber and which, after going on to the material to be dyed, is then oxidized back to the water-insoluble vat dye pigment.

WO-A-94/23114 discloses an ecologically advantageous dyeing process which utilizes indigo in the form of the caustic aqueous leuco indigo solution obtained by catalytic reduction of an indigo suspension and which dramatically reduces the levels of sulfate or organics in the wastewater compared with the conventional dyeing processes.

Since, however, it has hitherto not been possible to prepare concentrated leuco indigo solutions which are stable and do not tend to crystallize out, the leuco indigo solutions used in WO-A-94/23114 have only a leuco indigo content of 20% by weight, too.

It is an object of the present invention to provide highly concentrated leuco indigo solutions which permit a further reduction in the dispensing volumes needed for dyeing and hence are even more effective in reducing the risk of dyebath overflow and also make a contribution to lowering the costs of transporting the dye solution from the manufacturer to the dyer.

We have found that this object is achieved by the concentrated leuco indigo solutions defined at the beginning.

This invention further provides a process for preparing these leuco indigo solutions by catalytic hydrogenation of alkaline aqueous indigo suspensions, which comprises performing the hydrogenation in stages and first hydrogenating a from 20 to 30% strength by weight indigo suspension comprising from 4 to 10% by weight of a mixture of at least two alkali metal hydroxides wherein none of the alkali metal hydroxides accounts for more than 70 mol % to form leuco indigo, then adding further indigo to set the ultimately desired leuco indigo content and also, if appropriate, alkali metal hydroxide mixture, and continuing the hydrogenation.

The present invention also provides a further preparation process which comprises first catalytically hydrogenating a from 20 to 30% strength by weight alkaline aqueous indigo suspension comprising from 4 to 10% by weight of the alkali metal hydroxide mixture described above and setting the resulting leuco indigo solution to the desired leuco indigo content by evaporation.

The present invention lastly provides for the use of the leuco indigo solutions for dyeing cellulosic textile material.

The leuco indigo solutions of the present invention comprise from 25 to 55% by weight, preferably from 30 to 55% by weight, particularly preferably from 35 to 50% by weight, very particularly preferably from 40 to 45% by weight, of leuco indigo in the form of leuco indigo alkali metal salt.

The second essential constituent of the leuco indigo solutions of the present invention is the alkali metal hydroxide mixture with which the leuco indigo vat acid is converted into the leuco indigo vat salt.

The alkali metal hydroxide mixture of the present invention comprises at least two different alkali metal hydroxides subject to the proviso that none of the alkali metal hydroxides should account for more than 70 mol % in the mixture.

Suitable alkali metal hydroxides include for example lithium hydroxide, sodium hydroxide and potassium hydroxide, which may all be present as a triple mixture or in the form of the respective double combinations, in which case mixtures of sodium hydroxide and potassium hydroxide are preferred.

In mixtures of two alkali metal hydroxides, the proportion of one of the hydroxides is preferably within the range from 70 to 30 mol % and that of the other correspondingly within the range from 30 to 70 mol %. Particular preference is given to levels of from 60 to 40 mol % on the one hand and from 40 to 60 mol % on the other. Very particularly preferably, the two hydroxides (especially sodium hydroxide and potassium hydroxide) are present in approximately equal weight quantities, i.e., their weight ratio is within the range from 0.8:1 to 1.2:1, especially about 1:1.

The leuco indigo solutions of the present invention include the alkali metal hydroxide mixture in an amount which is essentially stoichiometrically sufficient for the complete formation of the neutral vat salt, i.e., generally from 1.5 to 2.5 mol of alkali metal hydroxide mixture per mole of leuco indigo.

Surprisingly, the leuco indigo solutions of the present invention are very stable and, in contradistinction to the known leuco indigo solutions in which the leuco indigo is present as a pure sodium salt, do not tend to crystallize out. For instance, the leuco indigo solutions of the present invention of up to about 40% by weight have an unlimited storage life under nitrogen at low temperatures down to about 10° C. (30–35% strength by weight solutions can even be transported and handled when it is frosty); solutions from 50 to 55% strength by weight are better stored at from about 40 to 60° C. to avoid crystallization.

The leuco indigo solutions of the present invention can advantageously be prepared by the two processes likewise disclosed in the present invention.

In one of the processes, the preparation is effected by stagewise catalytic hydrogenation. The procedure employed is advantageously as follows:

First, a low concentration alkaline aqueous indigo suspension, comprising about 20–30% by weight of indigo and 4–10% by weight of the alkali metal hydroxide mixture of the present invention, is hydrogenated in a conventional manner using a nickel catalyst (Raney nickel) at a hydrogen pressure of typically 2–6 bar and a temperature which is generally within the range from 60 to 90° C. This is followed by the addition of the amount of indigo missing to set the ultimately desired leuco indigo content, either as solid or as aqueous suspension, and also, if insufficient alkali metal hydroxide was used in the first step, of a supplementary amount of alkali metal hydroxide mixture, and the continuation of the hydrogenation. After the catalyst has been filtered off, the leuco indigo solution is stored under a protective gas such as nitrogen.

In general, the two hydrogenation steps together take from about 10 to 12 h.

In the other process, an about 20–30% strength by weight leuco indigo solution is initially prepared, by catalytic hydrogenation, similarly to the above-described process and is then concentrated by evaporation until the desired leuco indigo content is obtained. The distillative removal of the water preferably takes place in the absence of oxygen at from about 60 to 1000 mbar and from 45 to 100° C.

Either process of the invention provides a simple reproducible way of preparing the novel leuco indigo solutions.

They are advantageously useful for dyeing cellulosic textile material, for which the procedure described in WO-A-94/23114 may be employed.

EXAMPLES

Preparation of Leuco Indigo Solutions According to the Invention

Example 1

In a 1 l glass autoclave equipped with a disk stirrer, 262 g of a 23% strength by weight aqueous indigo suspension which contained 48 g (1.2 mol) of sodium hydroxide and 45 g (0.8 mol) of potassium hydroxide had 6 g of Raney nickel in the form of a 50% strength by weight aqueous suspension added and were purged with nitrogen, heated to 70° C. and hydrogenated under a hydrogen pressure of 3 bar for 8 h.

After decompression, purging with nitrogen and cooling down to 30° C., a further 262 g of indigo granules, 48 g of sodium hydroxide and 45 g of potassium hydroxide and also a further 2 g of Raney nickel were added to the 23% strength by weight leuco indigo solution obtained in the first hydrogenation step. After purging with nitrogen, the leuco indigo solution was hydrogenated at 70° C. under a hydrogen pressure of 3 bar for a further 3 h.

After decompression, purging with nitrogen and cooling down to room temperature, the catalyst was filtered off.

The resulting 46% strength by weight leuco indigo solution exhibited no tendency to crystallize when stored under nitrogen at room temperature.

Example 2

500 ml of the leuco indigo solution obtained in the first step of Example 1 were purged with nitrogen and then subjected to a pressure of initially 120 mbar and then 80 mbar and a bath temperature of 120° C. to distill off 213 ml of water over 2 h. The remaining solution was cooled at room temperature under nitrogen.

The resulting 40% strength by weight leuco indigo solution exhibited no tendency to crystallize after four months of storage under nitrogen at room temperature.

Example 3

In a 1 l hydrogenating flask equipped with an intensive stirrer, a mixture of 474 g of a 23% strength by weight aqueous leuco indigo salt solution (potassium salt/sodium salt, weight ratio 1:1), 90 g of a 45% strength by weight aqueous alkali metal hydroxide solution (KOH/NaOH, weight ratio 1:1) and 220 g of dry indigo had 10 g of Raney nickel in the form of a 50% strength by weight added to it and was purged with nitrogen, heated to 70° C. and hydrogenated with hydrogen under atmospheric pressure for about 4 h.

After purging with nitrogen, cooling down to 40–50° C., the catalyst was filtered off and the concentration of the leuco indigo salt solution was adjusted to 40% strength by weight by addition of water.

Example 4

333 g of water were distilled off from 750 g of a 25% strength by weight aqueous leuco indigo salt solution (potassium salt/sodium salt, weight ratio 1:1) at a bath temperature of 140° C. at atmospheric pressure by passing a slow stream of nitrogen thereover. A 45% strength by weight leuco indigo solution was obtained.

Example 5

A mixture of 500 g of water, 132 g of dry indigo, 12.8 g of solid sodium hydroxide, 17.9 g of solid potassium hydroxide and 7.7 g of solid lithium hydroxide had 5 g of Raney nickel in the form of a 50% strength by weight aqueous suspension added to it, was purged with nitrogen, was heated to 70° C. and hydrogenated under atmospheric pressure for about 3.5 h.

The resulting, approximately 20% strength by weight leuco indigo solution was adjusted to a leuco indigo content of 45% by weight similarly to Example 4 by distillative removal of 226 g of water.

We claim:

1. A concentrated leuco indigo solution consisting essentially of from 25 to 55% by weight of leuco indigo, an amount which is essentially stoichiometrically sufficient to convert the leuco indigo into the neutral leuco indigo salt of a mixture of at least two alkali metal hydroxides wherein none of the alkali metal hydroxides accounts for more than 70 mol %, and water wherein the leuco indigo is in the form of its salt in said solution.

2. The leuco indigo solution as claimed in claim 1, wherefor the alkali metal hydroxides are selected from the group consisting of lithium hydroxide, sodium hydroxide and potassium hydroxide.

3. The leuco indigo solution as claimed in claim 1, comprising sodium hydroxide and potassium hydroxide.

4. The leuco indigo solution as claimed in claim 1, comprising sodium hydroxide and potassium hydroxide in a molar ratio of from 3:1 to 1:3.

5. The leuco indigo solution as claimed in claim 1, comprising from 35 to 45% by weight of leuco indigo.

6. A process for preparing leuco indigo solution as claimed in claim 1 by catalytic hydrogenation of alkaline aqueous indigo suspension, which comprises performing the hydrogenation in stages and first hydrogenating a from 20 to 30% strength by weight indigo suspension comprising from 4 to 10% by weight of a mixture of at least two alkali metal hydroxides wherein none of the alkali metal hydroxides accounts for more than 70 mol % to form leuco indigo, then adding further indigo to set the ultimately desired leuco indigo content and also, if appropriate, alkali metal hydroxide mixture, and continuing the hydrogenation.

7. A process for preparing leuco indigo solution as claimed in claim 1, which comprises first catalytically hydrogenating a from 20 to 30% strength by weight alkaline aqueous indigo suspension comprising from 4 to 10% by weight of a mixture of at least two alkali metal hydroxides wherein none of the alkali metal hydroxides accounts for more than 70 mol % and setting the resulting leuco indigo solution to the desired leuco indigo content by evaporation.

8. A method of dyeing comprising contacting leuco indigo solution as claimed in claim 1 cellulosic textile material.

* * * * *